United States Patent [19]
Heo et al.

[11] Patent Number: 5,892,746
[45] Date of Patent: Apr. 6, 1999

[54] SYSTEM FOR RECORDING AND/OR REPRODUCING A PULSE CODE MODULATION DIGITAL AUDIO SIGNAL

[75] Inventors: Jung-Kwon Heo, Jinju; Young-Nam Oh, Sungnam, both of Rep. of Korea

[73] Assignee: Samsung Electronics Co., Ltd., Kyungki-Do, Rep. of Korea

[21] Appl. No.: 874,730

[22] Filed: Jun. 13, 1997

Related U.S. Application Data

[60] Provisional application No. 60/019,933 Jun. 14, 1996.
[51] Int. Cl. [6] ....................................................... G11B 7/00
[52] U.S. Cl. ................................. 369/59; 369/58; 369/47
[58] Field of Search ................................... 369/58, 47, 48, 369/49, 50, 54, 32, 124; 360/48, 51, 53

[56] References Cited

FOREIGN PATENT DOCUMENTS

| | | |
|---|---|---|
| 0 511 692 A2 | 1/1990 | European Pat. Off. . |
| 0511692A | 1/1990 | European Pat. Off. . |
| 0708533A | 5/1990 | European Pat. Off. . |
| 0702368A | 7/1995 | European Pat. Off. . |
| 2175731 | 5/1985 | United Kingdom . |
| WO 90/09022 | 8/1990 | WIPO . |
| WO 90/09064 | 8/1990 | WIPO . |
| WO 91/16769 | 10/1991 | WIPO . |
| WO 92/17884 | 10/1992 | WIPO . |

*Primary Examiner*—Muhammad N. Edun
*Attorney, Agent, or Firm*—Sughrue, Mion, Zinn, Macpeak & Seas, PLLC

[57] ABSTRACT

A digital audio recording apparatus for formatting digital audio data and recording formatted data on a digital recording medium, so that digital audio data having a first sampling frequency and other digital audio data having a second sampling frequency being twice the first sampling frequency, can be reproduced in both a reproduction apparatus having an operating frequency, for digital-to-analog converting the first sampling frequency and that having an operating frequency for digital-to-analog converting the second sampling frequency. The digital audio recording apparatus transforms the digital audio data into transformation coefficients in a frequency domain, the transformation coefficients are formatted using one of predetermined recording formats. Corresponding digital audio reproduction apparatus reproduces an analog audio signal from the formatted data, based on an operating frequency for D/A conversion, a formatting method of the formatted data, and a sampling frequency of the audio signal contained in the formatted data.

15 Claims, 3 Drawing Sheets

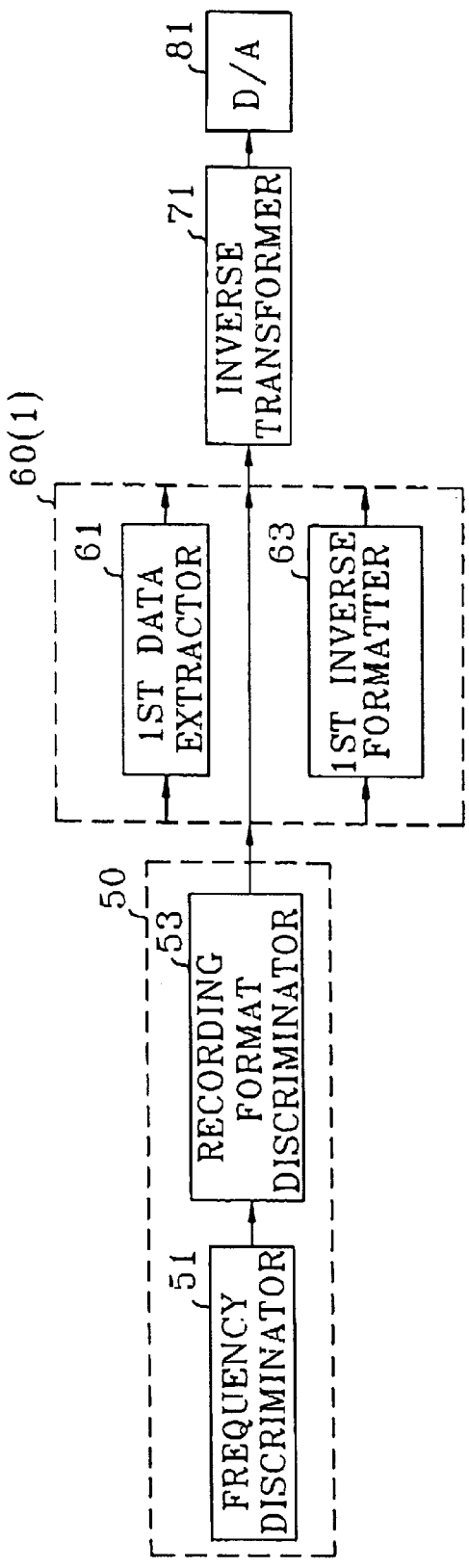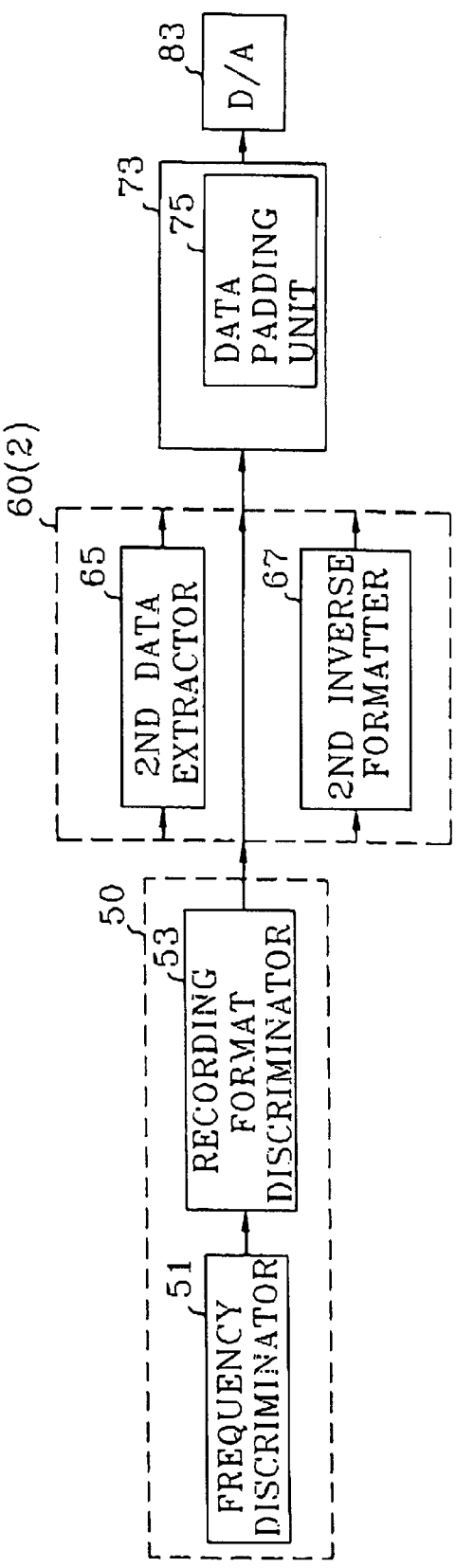

SYSTEM FOR RECORDING AND/OR REPRODUCING A PULSE CODE MODULATION DIGITAL AUDIO SIGNAL

This application claims priority to U.S. Provisional application Ser. No. 60/019,933 filed Jun. 14, 1996.

BACKGROUND OF THE INVENTION

The present invention relates to a system for recording and/or reproducing a pulse code modulation (PCM) digital audio signal, and more particularly, to a system for recording and/or reproducing a PCM digital audio signal, in which digital audio signals can be recorded on a digital recording medium or can be reproduced from the digital recording medium, even though sampling frequencies of the PCM digital audio signals differ from each other.

All apparatuses which use PCM digital audio signals use a reference unit, which is a data unit for enabling error correction. The size of the reference unit is determined according to the features of a transmission medium. A digital audio signal which has been sampled according to a predetermined sampling frequency is recorded on a recording medium in the form of blocks having a size, or amount of data, which is determined according to a data recording characteristic of the recording medium, such as a compact disk (CD), a digital audio tape (DAT) and so on. When a reproduction operation is performed with respect to the recording medium, a digital-to-analog converter converts a digital audio signal into an analog audio signal in the sequence of the outflow of the data from the recording medium.

As to PCM digital audio signals, in order to replace an existing system which uses sampling frequencies of 44.1 KHz or 48 KHz, with new audio recording systems which use sampling frequencies of 88.2 KHz or 96 KHz, for example, an advanced audio (ADA) system in Japan, has been proposed. However, the existing reproduction system which uses the sampling frequencies of 44.1 KHz or 48 KHz, cannot reproduce audio signals which have been recorded in a digital form according to the newly proposed system. Therefore, in order to allow such an existing reproducing system to reproduce a digital audio signal which has been recorded according to a new recording system, separate digital signal processing is required so that a bit number representing each sample without creating noise can be handled. Examples of the required digital signal processing include, low-pass filtering to eradicate a frequency component higher than 44.1 KHz or 48 KHz from a signal read from a recording medium, and decimation filtering to make the low-pass filtered signal into a signal having the sampling frequency of 44.1 KHz or 48 KHz.

For this reason, the existing reproduction system should process all input audio data in order to reproduce an audio signal according to the newly proposed system. Consequently, a digital processor having an operating frequency larger than a sampling frequency of the input audio data, is required. However, it is expensive to improve the existing reproducing system in order to reproduce a digital audio signal of the proposed signal recording system. Also, additional RAM capacity is required for the above-described separate digital signal processing, also increasing the cost necessary for such an improvement.

Meanwhile, a reproducing system which includes a digital-to-analog converter having sampling frequencies of 88.2 KHz or 96 KHz, directly transmits received data to an output terminal without processing the received data. Thus, a digital processor for processing audio data and a large amount of RAM capacity are not required. However, if another audio recording system using a frequency higher than 88.2 KHz (or 96 KHz) is proposed, the same problems as those of existing system will be created.

SUMMARY OF THE INVENTION

To solve the above problems, it is one object of the present invention to provide a system for recording audio signals sampled in accordance with an existing recording method and a new recording method in both an existing audio apparatus and a new audio apparatus employing the new recording method. This is done by converting audio samples within a predetermined reference unit of a digital audio signal into transformation coefficients of a frequency domain and formatting the transformation coefficients according to a predetermined recording format.

Another object of the invention is to provide a system for reproducing audio signals sampled in accordance with an existing recording method and a new recording method in both an existing audio apparatus and a new audio apparatus employing the new recording method. This is done by converting audio samples within a predetermined reference unit of a digital audio signal into transformation coefficients of a frequency domain and formatting the transformation coefficients according to a predetermined recording format.

To accomplish the above objects of the present invention, there is provided a digital audio recording apparatus for a digital recording medium, the digital audio recording apparatus comprising:

reference unit formation means for receiving a pulse-code-modulated digital audio signal, and forming a sequence of reference units, each reference unit having a predetermined size, from the received digital audio signal;

transformation means receiving the sequence of reference units for transforming audio samples belonging to an individual reference unit into transformation coefficients in a frequency domain, and outputting a reference unit sequence containing transformation coefficients;

formatting means for receiving the reference unit sequence from the transformation means and formatting and outputting the received reference unit sequence, using one of a first recording format and a second recording format, wherein the first recording format forms a first recording unit containing transformation coefficients belonging to respective reference units, the second recording format forms both a second recording unit containing transformation coefficients belonging to a lower frequency area and a third recording unit containing transformation coefficients belonging to a higher frequency area among transformation coefficients contained in respective reference units; and recording means for recording the recording unit sequence output from the formatting means on the digital recording medium.

To achieve another object of the present invention, there is provided a digital audio reproduction apparatus comprising:

an input end for receiving data formatted by using one of a first recording format and a second recording format, wherein the first recording format forms a first recording unit containing transformation coefficients belonging to each reference unit, and the second recording format forms a second recording unit containing transformation coefficients in a lower frequency area and a third recording unit containing transformation coefficients in a higher frequency area among transformation coefficients contained in each reference unit;

a digital-to-analog (D/A) converter for digital-to-analog converting an input digital audio signal according to a predetermined operating frequency;

means, coupled to the input end, for discriminating the sampling frequency of the audio signal contained in the input formatted data and a recording format, and outputting data representing the discrimination result;

inverse formatting means, coupled to the input end and receiving data output from means for discriminating, for inversely formatting the formatted data received based on the comparison between the discriminated sampling frequency and the predetermined operating frequency and the discriminated recording format of prestored first and second recording formats; and inverse transformation means having an inverse transformation characteristic optimized to the D/A converter, for transforming the transformation coefficients output from the inverse formatting means into audio samples in a temporal domain, and supplying resultant audio samples to the D/A converter.

BRIEF DESCRIPTION OF THE DRAWINGS

The preferred embodiments are described with reference to the drawings wherein:

FIGS. 3A through 3D are views for explaining recording formats according to the present invention;

FIG. 4 is a schematic block diagram of a digital audio reproduction apparatus according to the present invention; and FIG. 5 is a block diagram of a digital audio is reproduction apparatus according to the present invention.

DETAILED DESCRIPTION OF THE PREFERRED EMBODIMENTS

Preferred embodiments of the present invention will be described below in more detail with reference to the accompanying drawings.

Figure 1:
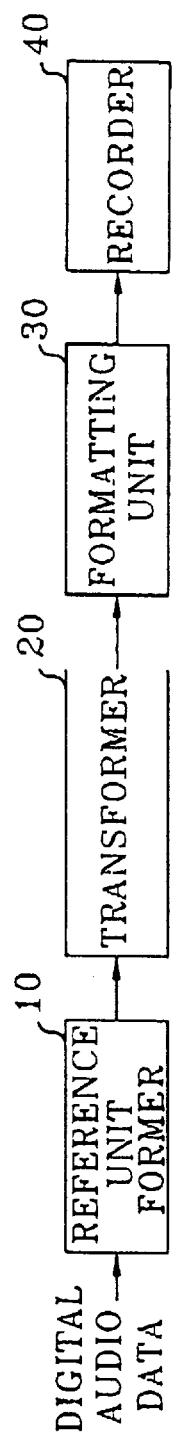
FIG. 1 is a schematic block diagram of a digital audio recording apparatus according tn a preferred embodiment of the present invention.

A digital audio signal recording apparatus according to the present invention shown in FIG. 1, can record an audio signal having sampling frequencies of 44.1 KHz or 48 KHz according to an existing audio recording method as well as an audio signal having sampling frequencies of 88.2 KHz or 96 KHz according to a new audio recording method, on a recording medium according to a recording format proposed in the present invention. For clarity of explanation, a relatively higher sampling frequency is called a first sampling frequency, and a relatively lower sampling frequency is called a second sampling frequency.

An audio signal sampled in a temporal domain which is quantized using linear PCM is input to a reference unit former 10 of FIG. 1. Reference unit former 10 divides the input digital audio signal into reference units each having a predetermined size. The reference unit and the recording unit, which will be described, are determined by an audio quality and the characteristic of the transmission medium. In other words, the reference unit size is determined based on an amount of data, on which error is imposed during recording and reproducing linear pulse-code-modulated digital audio signal, that can be corrected. The recording unit size is determined based on an amount of data which can be continuously recorded on, or read out from, a digital recording medium based on a signal recording characteristic of the digital recording medium.

An example of the reference unit obtained by division is shown in FIG. 3A. The reference unit of FIG. 3A is composed of a sequence of $2m$ audio samples. Reference unit former 10 sequentially supplies the reference units obtained by division to transformer 20. Transformer 20 transforms the audio samples into transformation coefficients in a frequency domain. The capability of transformer 20 is determined by the audio quality of a target audio signal. The transformation coefficients obtained by the domain transformation of the individual reference units are output to formatting unit 30 in a form such that each reference unit can be discerned. Formatting unit 30 formats transformation coefficients in each reference unit, by using one of a first recording format illustrated in FIG. 3B, and a second recording format illustrated in FIGS. 3C and 3D. The detailed construction and the operation of formatting unit 30 will be described in detail with reference to FIG. 2 and FIGS. 3B through 3D. Recorder 40 digitally records the data formatted in formatting unit 30 on a digital recording medium (not shown) such as a CD and a DAT.

Figure 2:
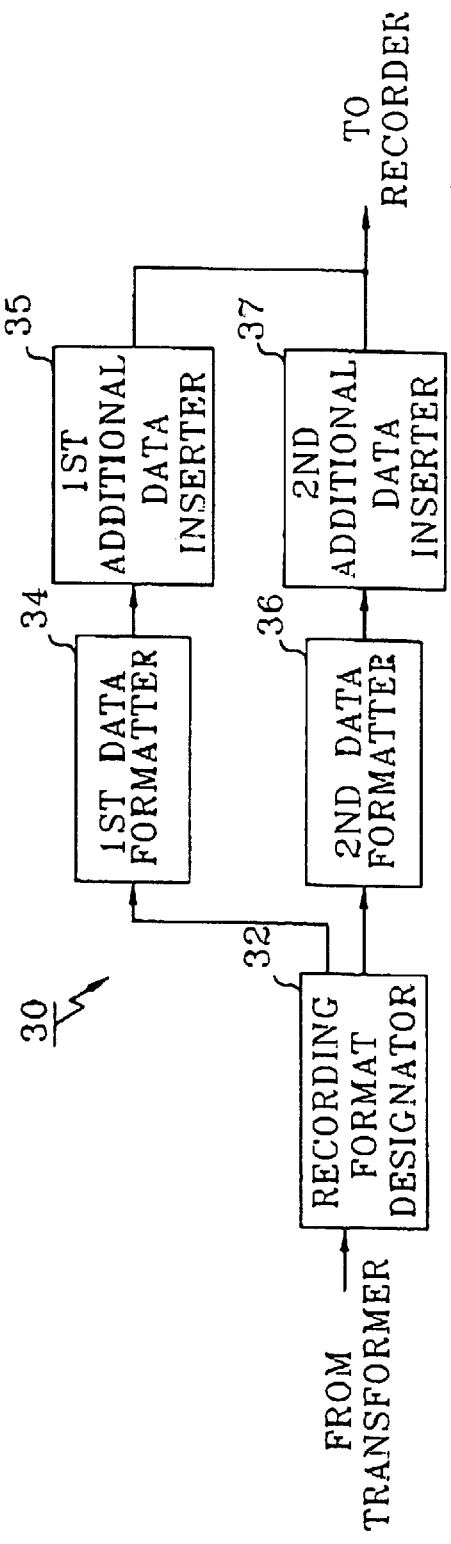
FIG. 2 is a detailed block diagram of a formatting unit shown in FIG. 1.

FIG. 2 showing a detailed block diagram of formatting unit 30. Recording format designator 32 in formatting unit 30 designates one of a first and a second recording format with respect to the reference units obtained in reference unit former 10. The recording format designation of recording format designator 32 can be accomplished by a user who intends to record an audio signal, by design.

When a first recording format is selected, recording format designator 32 outputs a sequence of the transformation coefficients which are received from transformer 20 to first data formatter 34. First data formatter 34 formats audio samples within an individual reference unit into a first recording unit and outputs a sequence of the first recording units to first additional data inserter 35. The first recording unit includes transformation coefficients obtained from one reference unit.

FIG. 3B shows transformation coefficients $F[0]$, $F[1]$, $F[2]$, ..., and $F[2m]$ contained in a first recording unit. In FIG. 3B, $F[0]$ represents the transformation coefficient of the lowest frequency, and $F[2m]$ represents the transformation coefficient of the highest frequency. First additional data inserter 35 inserts first additional data representing a sampling frequency of the audio signal contained in the received recording unit sequence and second additional data representing the number of the audio samples in an individual recording unit, into the beginning portion of the recording unit sequence. Because the present invention is not limited in the example where the first and second additional data is inserted into the beginning portion of the recording unit sequence, it is apparent to a person skilled in the art that first data formatter 34 may be modified in such a manner that the first and second additional data can be properly inserted in the recording unit sequence according to the characteristics of a transmission channel or a recording medium.

When a second recording format is selected, recording format designator 32 outputs a sequence of the reference units, which are received from transformer 20, to second data formatter 36. Second data formatter 36 formats the transformation coefficients within an individual reference unit, applied from recording format designator 32, into two recording units. In more detail, second data formatter 36 bisects the transformation coefficients in the reference unit and forms a second recording unit composed of transformation coefficients in a relatively lower frequency area and a third recording unit composed of transformation coefficients in a relatively higher frequency area. Therefore, two recording units are obtained from a reference unit. FIG. 3C shows transformation coefficients F[0], F[1], F[2], ..., and F[m] contained in the second recording unit. FIG. 3D shows transformation coefficients F[m], F[m+1], F[m+2], ..., and F[2m] contained in the third recording unit. Second data formatter 36 outputs a sequence of recording units obtained from a sequence of reference units to second additional data inserter 37. In the sequence of the recording units, the second and third recording units, corresponding to a relatively time-leading reference unit, time-lead those corresponding to a relatively time-lagging reference unit. In case of the recording units corresponding to the same reference unit, the second recording unit time-leads the third recording unit.

The second additional data inserter 37 receives a sequence of the recording units from the second data formatter 36 and inserts the first additional data and the second additional data, mentioned previously, into the beginning portion of the recording unit sequence output from the second data formatter 36. Also, the second additional data inserter 37 inserts third additional data for discerning second and third recording units obtained from the same reference unit into the beginning portion of the respective beginning portion of second and third recording units.

The above-described apparatus of FIG. 1 may use the two recording formats. However, it is desirable that only one recording format be used in an actual embodiment thereof. If the FIG. 1 apparatus uses the two recording formats, separate additional recording format data for discerning the two recording formats is needed. In this case, recorder 40 in the FIG. 1 apparatus inserts the recording format data in the beginning portion of the formatted data.

The FIG. 4 reproducing apparatus which reproduces a digital audio signal from a recording medium (not shown), on which the digital audio signal is recorded, includes a D/A converter 81 having the same operating frequency as the second sampling frequency. A reader 50 reads formatted data from the recording medium (not shown) on which the digital audio signal, which is transformed into a frequency domain, is recorded. The audio signal contained in the formatted data may have a first sampling frequency or a second sampling frequency as described above. A frequency discriminator 51 in reader 50 discriminates a sampling frequency of digital audio signal based on first additional data contained in the read formatted data, and outputs the discriminated result to a recording format discriminator 53.

Recording format discriminator 53 uses additional data which is contained in the formatted data received from the frequency discriminator 51 to discriminate the recording format of the formatted data. If the signal recorded on the recording medium is data formatted according to a first recording format, the data contains first and second additional data and recording format data. If the signal recorded on the recording medium is data formatted according to a second recording format, the data contains first, second and third additional data and recording format data. Reader 50 supplies the second and third additional data and the sequence of the recording units based on the frequency discrimination result and the discriminated recording format to inverse formatting unit 60(1). For data supply, the apparatus can be designed such that reader 50 supplies all the data read from the recording medium to inverse formatting unit 60(1), and inverse formatting unit 60(1) discriminates the sampling frequency and the recording format based on the data received from reader 50 and selectively supplies audio data to inverse transformer 71.

When the data recorded on the recording medium has a first sampling frequency and a first recording format, inverse formatting unit 60(1) supplies the data received from reader 50 to a first data extractor 61. First data extractor 61 extracts the transformation coefficients in the low frequency area for every first recording unit of the data received from reader 50. In more detail, first data extractor 61 extracts the transformation coefficients of the low frequency area from the transformation coefficients in the individual recording unit based on the second additional data contained in the data received from reader 50 and cancels the second additional data from the received data. Here, the low frequency area means a lower frequency area of the two frequency areas which are bisected from the whole frequency area represented by all transformation coefficients in an individual first recording unit. As a result, the individual first recording unit data output from reader 50 is decimated by two to one (2:1) by means of first data extractor 61. When the data recorded on the recording medium has a first sampling frequency and a second recording format, inverse formatting unit 60(1) supplies the data received from reader 50 to first data extractor 61. First data extractor 61 extracts the second recording units based on the third additional data contained in the data received from reader 50, and cancels the third additional data. When the data recorded on the recording medium has a second sampling frequency and a first recording format, inverse formatting unit 60(1) cancels the second additional data contained in the data received from reader 50. When the data recorded on the recording medium has a second sampling frequency and a second recording format, first inverse formatting unit 60(1) supplies the data received from reader 50 to a first inverse formatter 63. First inverse formatter 63 inversely formats the second and the third recording unit corresponding to the same reference unit based on the prestored second recording format and the third additional data. Then, first inverse formatter 63 cancels the third additional data and outputs the remaining transformation coefficients in the above signal processing to inverse transformer 71.

Because the present invention is not limited to the example where first data extractor 61 and first inverse formatter 63 cancel the second and/or the third additional data, it is apparent to a person skilled in the art to modify inverse formatting unit 60(1) to cancel the second and third additional data.

Also, it is apparent to a person skilled in the art that the modifications that reader 50 outputs all the data read from the recording medium to inverse formatting unit 60(1), and inverse formatting unit 60(1) cancels the recording format data among the data received from reader 50.

Inverse transformer 71, which is adequately designed to inversely transform transformation coefficients of an individual reference unit obtained from the audio samples having a second sampling frequency, inversely transforms transformation coefficients received from inverse formatting unit 60(1) into audio samples in a temporal domain. The audio samples output from inverse transformer 71 are digital-to-analog converted in D/A converter 81. The FIG. 4 apparatus can reproduce an audio signal having a sampling frequency corresponding to two times the operating frequency of D/A converter 81 as well as an audio signal having a sampling frequency corresponding to an operating frequency of D/A converter 81. Thus, when the audio signal recorded on the recording medium has a first sampling frequency and D/A converter 81 operates according to a second sampling frequency, the FIG. 4 apparatus can provide an audio signal having the same audio quality that cannot be discriminated by the human auditory system.

Differently from the FIG. 4 apparatus, FIG. 5 shows a reproduction apparatus including a D/A converter 83 having the same operating frequency as a first sampling frequency. In FIG. 5, because the blocks having the same reference numerals as those of FIG. 4 perform the same functions as those of FIG. 4, the detailed description thereof will be omitted. An inverse formatting unit 60(2) performs an inverse formatting operation with respect to formatted data, using the data received from reader 50. When the data recorded on the recording medium has a first sampling frequency and a first recording format, inverse formatting unit 60(2) supplies the data received from reader 50 to a second data extractor 65. Second data extractor 65 extracts the first recording units contained in the data received from reader 50 and then cancels the second additional data. Thereafter, inverse formatting unit 60(2) outputs the frequency discrimination result and the first recording units to an inverse transformer 73. Inverse transformer 73 determines that the currently received first recording units have the same sampling frequency as a sampling frequency in D/A converter 83 based on the frequency discrimination result and transforms transformation coefficients contained in the individual first recording unit into audio samples in a time domain. When the data recorded on the recording medium has a second sampling frequency and a first recording format, second data extractor 65 in inverse formatting unit 60(2) cancels the second additional data contained in the data received from reader 50 and outputs the first recording units and the frequency discrimination result to inverse transformer 73. In this case, if the transformation coefficients belonging to the first recording unit are transformed into the audio samples of the temporal domain, the number of the audio samples becomes smaller than that of the audio samples belonging to the reference unit relating to the signal processing of the FIG. 5 apparatus. For this reason, data padding unit 75 in inverse transformer 73 performs zero padding to fill the data in the frequency domain. Inverse transformer 73 transforms the zero-padded transformation coefficients of the first recording unit into the audio samples in the temporal domain.

When the data recorded on a recording medium has a first sampling frequency and a second recording format, a second inverse formatter 67 in inverse formatting unit 60(2) inversely formats the data received from reader 50 based on a prestored second recording format. In more detail, second inverse formatter 67 inversely formats the second and third recording units, both of which correspond to the same reference unit, into a corresponding reference unit based on the third additional data and the second recording format. Thereafter, inverse formatting unit 60(2) cancels the third additional data and the recording format data and outputs a sequence of the reference units and a frequency discrimination result to inverse transformer 73. Inverse transformer 73 transforms the transformation coefficients of each reference unit into the audio samples of the temporal domain based on the frequency discrimination result received from inverse formatting unit 60(2).

When the data recorded on the recording medium has a second sampling frequency and a second recording format, second inverse formatter 67 inversely formats the second and third recording units received from reader 50 based on the third additional data and the prestored second recording format. In this case, the number of the audio samples in the temporal domain become smaller than those of the audio samples which are required for signal processing in the FIG. 5 apparatus. Data padding unit 135 performs the above-described zero-padding, and the resultant reference units are transformed into the audio samples of the temporal domain in inverse transformer 133. These audio samples are digital-to-analog converted in D/A converter 143. Thus, the FIG. 5 apparatus can provide a digital audio signal having the existing sampling frequency to a listener as an acoustic signal having the same audio quality as that of the signal having the sampling frequency according to the new recording method.

It is possible that inverse transformer 73 of FIG. 5 can be designed to inversely transform transformation coefficients of individual reference units obtained from the audio samples having a second sampling frequency. In this case, inverse transformer 73 can determine whether or not the data padding is performed without the frequency discrimination result of inverse formatting unit 60(2).

Assuming that each reference unit is composed of K transformation coefficients, a first sampling frequency is L, and a second sampling frequency is M, the number of transformation coefficients needed in the existing reproduction apparatus having an operating frequency corresponding to the second sampling frequency is calculated according to a formula Int(K×M)/L. Here, "Int" is an operator for discarding a value smaller than an integer value. In this case, the transformation coefficients having the number obtained by the above formula are transformed into the audio samples of the temporal domain. Using this concept, the system according to the present invention can be applied to an audio apparatus where a sampling frequency of an audio signal increases to an integer multiple of the first sampling frequency.

The above embodiments have been described in connection with the first and second sampling frequencies. However, the present invention can be applied to an audio signal having the sampling frequency larger than the first sampling frequency.

As described above, the audio signal recording and reproduction system according to the present invention can reproduce the audio signals having a two-times frequency difference between the sampling frequencies in the audio apparatus having a relatively lower sampling frequency and an audio apparatus having a relatively higher sampling frequency.

Also, the audio signals having the different sampling frequencies can be reproduced in the audio apparatus having a relatively lower sampling frequency and an audio apparatus having a relatively higher sampling frequency. In addition, the present invention can be further applied to an audio apparatus adopting a new sampling frequency which increases at an integer multiple.

What is claimed is:

1. A digital audio recording apparatus for a digital recording medium, the digital audio recording apparatus comprising:

reference unit formation means for receiving a pulse-code-modulated digital audio signal, and forming a sequence of reference units each reference unit having a predetermined size from the received digital audio signal;

transformation means for receiving the sequence of reference units, for transforming audio samples belonging to an individual reference unit into transformation coefficients in a frequency domain, and outputting a reference unit sequence containing transformation coefficients;

formatting means for receiving the reference unit sequence from said transformation means, designating one of a first recording format and a second recording format to be used, and formatting and outputting the received reference unit sequence, using one of the first recording format and the second recording format, wherein the first recording format is for forming a first recording unit containing transformation coefficients belonging to respective reference units, the second recording format is for forming both a second recording unit containing transformation coefficients belonging to a lower frequency area and a third recording unit containing transformation coefficients belonging to a higher frequency area among transformation coefficients contained in respective reference units; and recording means for recording the recording unit sequence output from said formatting means on the digital recording medium.

2. The digital audio recording apparatus according to claim 1, wherein said lower frequency area and said higher frequency area are bisected from a frequency band represented by transformation coefficients.

3. The digital audio recording apparatus according to claim 1, wherein said reference unit predetermined size is determined based on an amount of audio data, on which error imposed during recording and reproducing a linear pulse-code-modulated digital audio signal, that can be corrected.

4. The digital audio recording apparatus according to claim 1, wherein the recording unit size is determined based on an amount of data which can be continuously recorded on a digital recording medium based on a signal recording characteristic of the digital recording medium.

5. The digital audio recording apparatus according to claim 1, wherein said formatting means further comprises an additional data inserter for inserting additional data representing the sampling frequency of the audio signal which is contained in the recording unit sequence with regard to a sequence of the first recording units produced by using the first recording format, into the recording unit sequence.

6. The digital audio recording apparatus according to claim 5, wherein said additional data inserter further inserts additional data representing the number of audio samples in an individual recording unit into the recording unit sequence.

7. The digital audio recording apparatus according to claim 1, wherein said formatting means comprises an additional data inserter for inserting first additional data representing a sampling frequency of the audio signal contained in a recording unit sequence into the recording unit sequence, and inserting a second additional data which discerns the first recording unit and the second recording unit obtained from the same reference unit, into beginning portions of each of the first and second recording units, with regard to the recording unit sequence produced by using the second recording format.

8. The digital audio recording apparatus according to claim 1, wherein said formatting means further inserts the recording format data for discerning the first recording format and the second recording format into said recording unit sequence.

9. A digital audio reproduction apparatus comprising:

an input end for receiving data formatted by using one of a first recording format and a second recording format, wherein the first recording format forms a first recording unit containing transformation coefficients belonging to each reference unit, and the second recording format forms a second recording unit containing transformation coefficients in a lower frequency area and a third recording unit containing transformation coefficients in a higher frequency area among transformation coefficients contained in each reference unit;

a digital-to-analog (D/A) converter for digital-to-analog converting an input digital audio signal based on a predetermined operating frequency;

means, coupled to said input end for discriminating a sampling frequency of the audio signal contained in the input formatted data and a recording format, and outputting data representing the discrimination result;

inverse formatting means, coupled to said input end and receiving data output from means for discriminating, for inversely formatting the formatted data received based on a comparison between the discriminated sampling frequency and the predetermined operating frequency and the discriminated recording format of pre-stored first and second recording formats; and inverse transformation means having an inverse transformation characteristic optimized to said D/A converter for transforming the transformation coefficients output from said inverse formatting means into audio samples in a temporal domain and supplying resultant audio samples to said D/A converter.

10. The digital audio reproduction apparatus according to claim 9, wherein said input end receives said formatted data from the digital recording medium.

11. The digital audio reproduction apparatus according to claim 9, wherein said each recording unit is determined based on an amount of data which can be continuously recorded on said digital recording medium based on a signal recording characteristic of the digital recording medium.

12. The digital audio reproduction apparatus according to claim 9, wherein said lower frequency area and said higher frequency area are bisected from the whole frequency area represented by transformation coefficients.

13. The digital audio reproduction apparatus according to claim 9, wherein said inverse formatting means supplies to said inverse transformation means the transformation coefficients of the lower frequency area among transformation coefficients contained in the first recording unit, when the discriminated sampling frequency is said predetermined operating frequency multiplied by factors of two, and the discriminated recording format is the first recording format.

14. The digital audio reproduction apparatus according to claim 9, wherein said inverse formatting means supplies the transformation coefficients contained in the second recording unit to said inverse transformation means, when the discriminated sampling frequency is said predetermined operating frequency multiplied by factors of two, and the discriminated recording format is the second recording format.

15. The digital audio reproduction apparatus according to claim 9, wherein said inverse formatting means supplies all transformation coefficients to said inverse transformation means when said predetermined operating frequency is the discriminated sampling frequency multiplied by factors of two, and, said inverse transformation means performs zero padding for every reference unit prior to inversely transforming the transformation coefficients received from said inverse transformation means.

* * * * *